United States Patent
Tse et al.

(10) Patent No.: US 7,477,051 B2
(45) Date of Patent: Jan. 13, 2009

(54) POSITION SENSOR AND POSITION SENSING METHOD

(75) Inventors: Celement Chiu Sing Tse, Kennedy Town (HK); Chi Keung Tang, Tai Po (HK); Kenny Chi Ken Lee, Tai Po (HK); Peter On Bon Chan, Shatin (HK); Chun Ching Lee, Tai Po (HK); Chi Pui Ho, Sai Wan Ho (HK)

(73) Assignee: Mosway Semiconductor Limited, Hong Kong SAR (CN)

( * ) Notice: Subject to any disclaimer, the term of this patent is extended or adjusted under 35 U.S.C. 154(b) by 346 days.

(21) Appl. No.: 11/480,385

(22) Filed: Jul. 5, 2006

(65) Prior Publication Data

US 2008/0007276 A1 Jan. 10, 2008

(51) Int. Cl.
*G01R 11/02* (2006.01)
(52) U.S. Cl. ............. 324/157; 324/76.11; 324/609
(58) Field of Classification Search ......... 324/157, 324/609, 76.11, 158.1; 446/175
See application file for complete search history.

(56) References Cited

U.S. PATENT DOCUMENTS 6,695,668 B2 * 2/2004 Donahue et al. ............ 446/175

* cited by examiner

*Primary Examiner*—Vincent Q Nguyen
(74) *Attorney, Agent, or Firm*—Leydig, Voit & Mayer, Ltd.

(57) ABSTRACT

A position sensor includes a first part having several electrically conductive elements, a second part having an electrical conductor, and holding device holding the first part and the second part together with the conductive elements and the conductor being spaced apart and permitting relative movement between the conductive elements and the conductor. Included is a signal generator for generating and supplying different electrical signals to one of the first part and the second part for reception in a contactless manner by the other of the first part and the second part with a magnitude that is dependent upon the relative position between the conductive elements and the conductor. There is also a signal detector connected to the other of the first part and the second part for differentiating the electrical signals received thereby to determine the relative position between the conductive elements and the conductor.

20 Claims, 8 Drawing Sheets

FIG. 9

POSITION SENSOR AND POSITION SENSING METHOD

The present invention relates to a position sensor and a position sensing method that are particularly, but not exclusively, suitable for use in toys and playthings.

BACKGROUND OF THE INVENTION

Position sensors have been generally known in the art, which in one basic form are provided by gravitational switches that typically incorporate a conductor loosely held adjacent to another conductor for contacting same upon movement under the action of gravity. Apart from various issues arising out of contact between conductors, the switch output is limited i.e. to indicate merely on and off positions. There are of course other different forms of position sensors, but few are both versatile and inexpensive.

The invention seeks to obviate or at least alleviate such a problem or shortcoming by providing an improved or other new position sensor and position sensing method.

SUMMARY OF THE INVENTION

According to a first aspect of the invention, there is provided a position sensor comprising:

a first part comprising a plurality of electrically conductive elements;

a second part comprising an electrical conductor;

holding means holding the first part and the second part together with the conductive elements and the conductor being spaced apart and permitting relative movement between the conductive elements and the conductor;

a signal generator adapted to generate and supply a plurality of different electrical signals to one of the first part and the second part, for reception in a contactless manner by the other of the first part and the second part with a magnitude that is dependent upon the relative position between the conductive elements and the conductor; and a signal detector connected to the other of the first part and the second part for differentiating the electrical signals received thereby to determine the relative position between the conductive elements and the conductor.

Preferably, the electrical signals comprise orthogonal signals for or associated with the conductive elements respectively.

In a preferred embodiment, the electrical signals are different in terms of time.

More preferably, the electrical signals are shifted in time from each other.

In another preferred embodiment, the electrical signals are different in terms of frequency.

More preferably, the electrical signals are at different frequencies.

It is preferred that the holding means comprises a hinged connection that permits relative pivotal movement between the conductive elements and the conductor.

It is further preferred that one of the first part and the second part has a centre of gravity offset from the hinged connection such that the said part will stay lowermost under the action of gravity while the other of the first part and the second part is angularly moved about the hinged connection.

It is yet further preferred that the conductor has a centre of gravity offset from the hinged connection.

It is further preferred that the conductive elements are located at regular positions around the hinged connection, and the conductor is elongate and has one end connected by the hinged connection.

In a different preferred embodiment, the holding means comprises electrical wired connection.

According to a second aspect of the invention, there is provided a position sensor comprising:

a first part comprising a plurality of electrically conductive elements;

a second part comprising an electrical conductor;

holding means holding the first part and the second part together with the conductive elements and the conductor being spaced apart and permitting relative movement between the conductive elements and the conductor;

a signal generator adapted to generate and supply an electrical signal to the conductor for reception in a contactless manner by the conductive elements with a magnitude that is dependent upon the relative position between the conductor and the conductive elements; and a signal detector connected to conductive elements for analyzing the magnitude of the electrical signals received thereby to determine the relative position between the conductor and the conductive elements.

Preferably, the holding means comprises a hinged connection that permits relative pivotal movement between the conductive elements and the conductor.

More preferably, one of the first part and the second part has a centre of gravity offset from the hinged connection such that the said part will stay lowermost under the action of gravity while the other of the first part and the second part is angularly moved about the hinged connection.

Further more preferably, the conductor has a centre of gravity offset from the hinged connection.

More preferably, the conductive elements are located at regular positions around the hinged connection, and the conductor is elongate and has one end connected by the hinged connection.

In a different preferred embodiment, the holding means comprises electrical wired connection.

According to a third aspect of the invention, there is provided a method of sensing position comprising the steps of:

(a) providing a first part comprising a plurality of electrically conductive elements;

(b) providing a second part comprising an electrical conductor;

(c) providing holding means holding the first part and the second part together with the conductive elements and the conductor being spaced apart and permitting relative movement between the conductive elements and the conductor;

(d) generating and supplying at least one electrical signal to one of the first part and the second part, for reception in a contactless manner by the other of the first part and the second part with a magnitude that is dependent upon the relative position between the conductive elements and the conductor; and (e) detecting and analyzing the magnitude of the electrical signals received by the other of the first part and the second part to determine the relative position between the conductive elements and the conductor.

It is preferred that:

step (d) comprises generating and supplying a plurality of different electrical signals to the conductive elements respectively for reception in a contactless manner by the conductor with a magnitude that is dependent upon the relative position between the conductive elements and the conductor; and step (e) comprises detecting and analyzing the magnitude of the electrical signals received by the conductor to determine the relative position between the conductive elements and the conductor.

It is preferred that:

step (d) comprises generating and supplying a plurality of an electrical signal to the conductor for reception in a contactless manner by the conductive elements with a magnitude that is dependent upon the relative position between the conductive elements and the conductor; and step (e) comprises detecting and analyzing the magnitude of the electrical signals received by the conductive elements to determine the relative position between the conductive elements and the conductor.

BRIEF DESCRIPTION OF DRAWINGS

The invention will now be more particularly described, by way of example only, with reference to the accompanying drawings, in which.

DETAILED DESCRIPTION OF PREFERRED EMBODIMENTS

Figure 1:
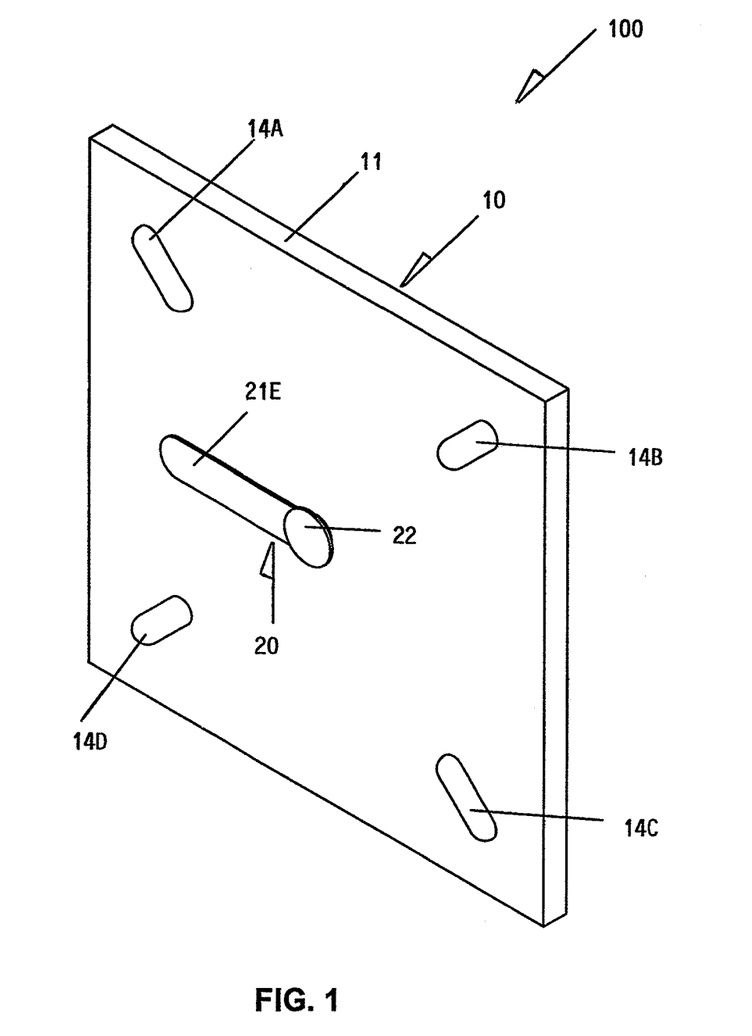
FIG. 1 is a front perspective view of a position device of an embodiment of a position sensor in accordance with the invention.
Figure 2:
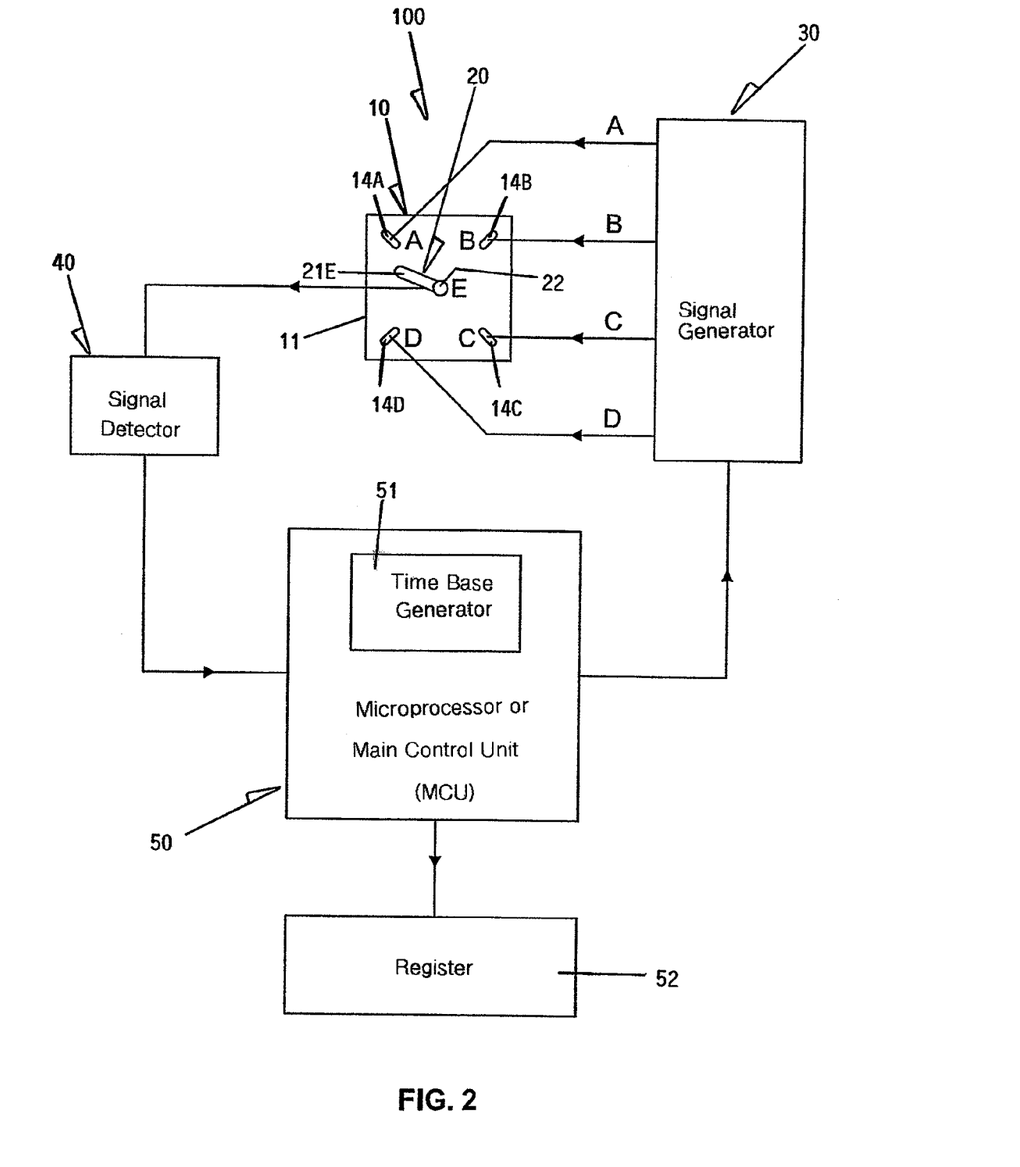
FIG. 2 is a schematic circuit diagram of the position sensor of FIG. 1, including a signal generator and a signal detector connected to the position device for operation based on signals shifted in time.
Figure 3:
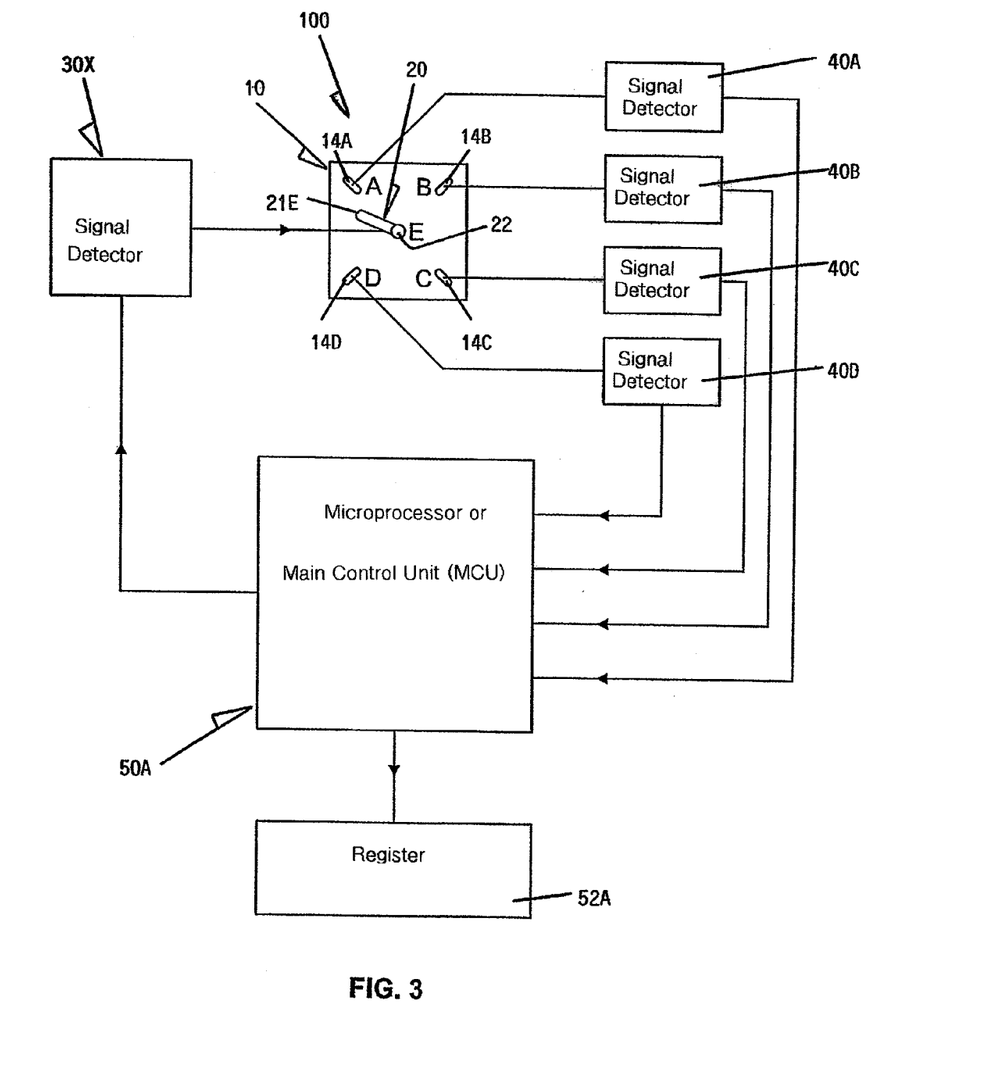
FIG. 3 is a schematic circuit diagram similar to FIG. 2, showing the use of a signal generator and several signal detectors connected to the position device in the opposite way.

Referring initially to FIGS. 1 to 3 of the drawings, there is shown a position sensor for operation using a position sensing method embodying the invention, which sensor includes a position device 100, a signal generator 30 connected to an input of the position device 100, a signal detector 40 connected to an output of the position device 100, and an MCU (microprocessor or main control unit) 50 connected to both the signal generator 30 and the signal detector 40 for operation therewith.

The position device 100 has a first part 10 comprised of a square circuit board 11 on which there are mounted four electrically conductive elements 14A to 14D symmetrically at respective corners of the board 11, a second part 20 implemented by an elongate electrical conductor strip 21E, and holding means in the form of a hinge 22 that connects the conductor strip 21E to the centre of the board 11.

The conductive elements 14A to 14D are positioned regularly around the central hinge 22. The conductor strip 21E is connected at its inner end by the hinge 22 which permits free pivoting or turning of the strip 21E on the board 11, about a normal central axis thereof, relative to the conductive elements 14A to 14D. The outer end of the conductor strip 21E reaches slightly short of the conductive elements 14A to 14D such that the strip 21E and the elements 14A to 14D are spaced apart at all time.

The position device 100 is intended for use generally upright, with the board 11 lying vertically such that the conductor strip 21E is pivotable relative to the board 11 about the axis of the hinge 22 that extends horizontally. Because the strip 21E is hinged at one end, its centre of gravity is offset from the hinge 22. The strip 21E is thus suspended from the hinge 22 vertically, and will stay lowermost under the action of gravity when the board 11 is turned about the hinge axis.

The signal generator 30 is adapted to generate and supply four different electrical signals to the conductive elements 14A to 14D of the first part 10 respectively, for coupling with and reception by the conductor strip 21E of the second part 20 in a contactless manner, primarily by way of induction. The signal detector 40 is connected to the conductor strip 21E of the second part 20, via the hinge 22 which is electrically conductive to provide a sliding contact, for differentiating the electrical signals received thereby. As the construction of the signal generator 30 and detector 40 is generally known in the art and is not part of the invention, it will not described herein, except to say that the detector 40 includes filters and amplifiers.

Such electrical signals are similar frequency pulse train signals which are produced by amplitude modulation of a carrier frequency in the range of 10 kHz to 100 kHz. The signals are practically the same as they share substantially the same pattern or waveform e.g. same pulse width and separation, but they are different in terms of time or phase, in the sense that their waveforms are shifted in time or phase from each other such that the pulses occur at different times or phase positions and hence the signals can be differentiated.

Figure 2A:
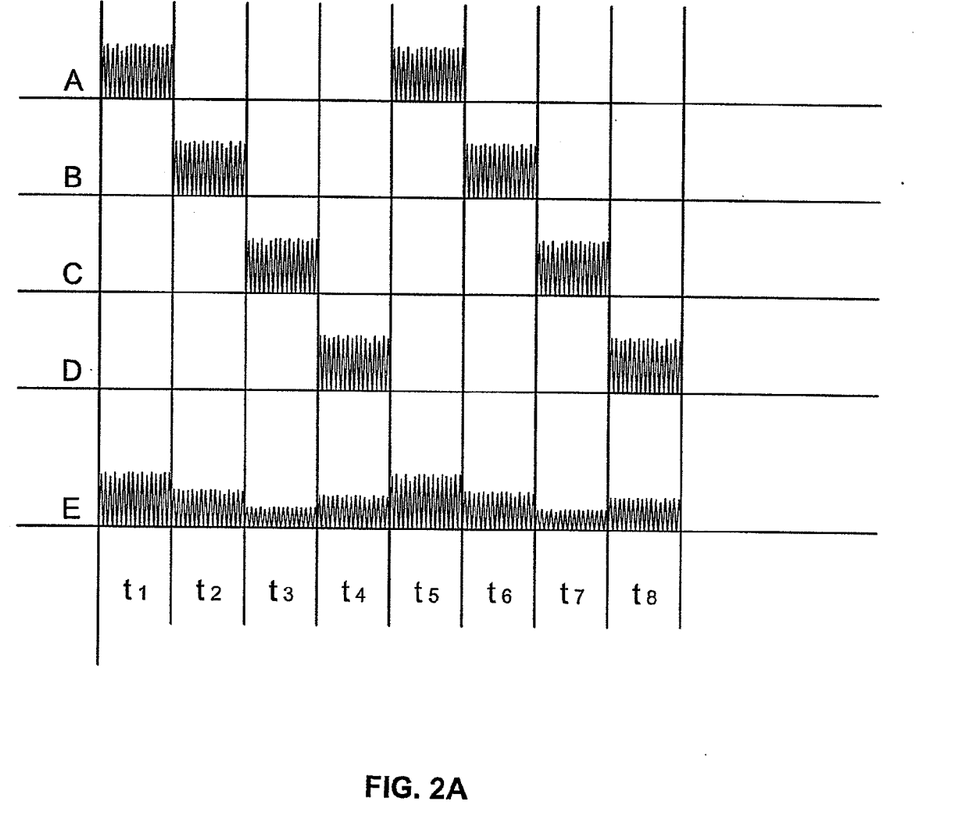
FIG. 2A is a schematic waveform diagram of the signals generated by the signal generator and detected by the signal detector.

In a preferred embodiment, the electrical signals associated with the conductive elements 14A to 14D have respective waveforms A to D as shown in FIG. 2A. Looking at a series of eight equal time slots $t_1$ to $t_8$ along the time axis, waveform A has two frequency pulses occupying the time slots $t_1$ and $t_{51}$ and the same two pulses of waveform B are shifted to the corresponding next time slots $t_2$ and $t_6$. The same coding scheme applies to the other two waveforms, that is to say the pulses of waveforms C and D appearing over the time slots $t_3$ and $t_7$ and time slots $t_4$ and $t_8$ respectively. The overall arrangement is such that the pulses of signals A to D are transmitted one-by-one from the conductive elements 14A to 14D in turn.

Four time slots $t_1$ to $t_4$, or $t_5$ to $t_8$, represent one cycle, each occupying a phase angle of 90°. The electrical pulse signals are orthogonal signals for, or associated with, the corresponding conductive elements 14A to 14D, as they are sent at right angles to each other so they do not interfere with each other.

The signal generator 30 and detector 40 are controlled by the MCU 50, which includes a time base generator 51 for both circuits 30 and 40 to operate on the same time base, or at the same sampling frequency, such that the signal detector 30 knows exactly when the pulses of signals A to D are transmitted from the corresponding conductive elements 14A to 14D.

At any given angular position relative to the conductive elements 14A to 14D, the conductor strip 21E is situated at a certain corresponding distance or separation from each of the elements 14A to 14D. Such a separation determines the strength or magnitude of the signal (pulses) from each of the elements 14A to 14D that the strip 21E picks up by induction. In general, the magnitude is dependent upon the relative position between the strip 21E and the elements 14A to 14D.

At a certain angular position of the conductor strip 21E, the signals picked up by the strips 21E from the four conductive elements 14A to 14D have a combined waveform E as shown in FIG. 2A, as an example. Because the strip 21E is situated at different separations from the elements 14A to 14D, the magnitude of the corresponding signal pulses received from these elements 14A to 14D vary accordingly. By keeping track of the time slots in which the signal pulses are received and analyzing their magnitude, the MCU 50 is able to calculate or identify the relative angular position of the strip 21E.

Information relating to the identified position of the strip 21E is then outputted to a certain register 52 (may be part of the MCU 50) for further operations.

In the described embodiment, the conductive elements 14A to 14D act as a transmitter for the position-identifying signals, whereas the conductor strip 21E acts as a receiver therefor. As the elements 14A to 14D and the strip 21E are both conductors and they are movable relatively to each other, their roles as between transmitter and receiver can be swapped using the setup of FIG. 3.

In this embodiment, a signal generator 30X is connected to the conductor strip 21E for generating and transmitting a predefined signal from the strip 21E, and four signal detectors 40A to 40D are connected to the conductive elements 14A to 14D respectively for detecting the signal collected by the elements 14A to 14D. An MCU 50A controls the operation of the signal generator 30X and detectors 40A to 40D.

On sampling, the MCU 50A instructs the signal generator 30X to supply the predefined signal to the strip 21E for transmission, whereupon all four signal detectors 40A and 40D receive the transmitted signal simultaneously. By reason of the difference in separation of the strip 21E from the individual elements 14A to 14D, the signals induced at the elements 14A to 14D vary in magnitude dependent upon the angular position of the strip 21E relative to the elements 14A to 14D. Thus, by comparing the magnitudes of the individual signals received by the elements 14A to 14D at different locations, the MCU 50A is able to identify the relative position of the strip 21E and output the corresponding signal to a register 52A.

Figure 4:
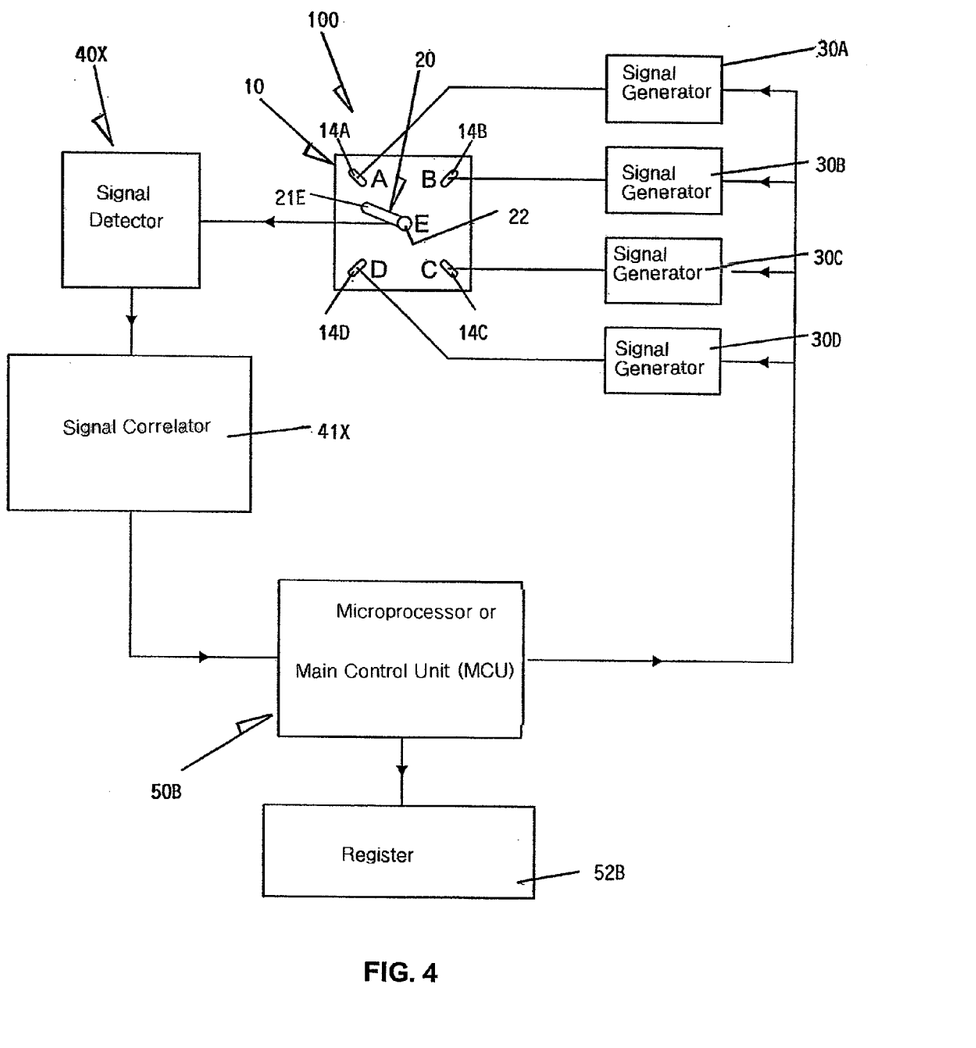
FIG. 4 is a schematic circuit diagram of the position sensor of FIG. 1, including several signal generators and a signal detector connected to the position device for operation based on signals at different frequencies.

FIG. 4 shows another setup for the use of a different signal coding scheme with the position device 100 to implement the subject position sensor and position sensing method, which is based on difference in signal frequency. In this embodiment, four signal generators 30A to 30D are connected to the conductive elements 14A to 14D respectively for generating and transmitting signals of different frequencies at the respective elements 14A to 14D, and a signal detector 40X connected to the conductor strip 21E for detecting and distinguishing the signals received by the strip 21E. The signal detector 40X co-operates with, or incorporates, a correlator 41X for differentiating the received signals. An MCU 50B, with an output register 52B, controls the operation of the signal generators 30A to 30D and the detector/correlator 40X/41X.

On sampling, the MCU 50B triggers the signal generators 30A to 30D to produce and supply different signals, at carrier frequencies of, say, 30 kHz, 34.5 kHz, 39.7 kHz and 45.6 kHz, to the associated conductive elements 14A to 14D for simultaneous transmission. The transmitted signals are received and processed (e.g. filtered and amplified) by the signal detector 40X and then fed to the correlator 41X for extracting the various frequency components originating from the respective elements 14A to 14D. The MCU 50B subsequently measures and compares the magnitudes of these frequency components. Once the source locations of the frequency components are established and their magnitudes compared, the angular position of the strip 21E relative to the elements 14A to 14D can then be ascertained for output at the register 52B.

With the contactless interaction between the two sets of conductors 14A to 14D and 21E, the position device 100 has a simple construction and can be built cheaply. Considering also that the related electronic components, i.e. the signal generator 30 and detector 40 and the MCU 50, etc., are also relatively basic and inexpensive, the overall position sensor can be manufactured at a relatively low cost, and yet it is able to output signals representing most, if not all, possible relative positions of the conductor 21E.

The position sensor and position sensing method of the subject invention unfold a variety of industrial applications, especially for toys and playthings whose price competitiveness is often a concern.

Figure 5:
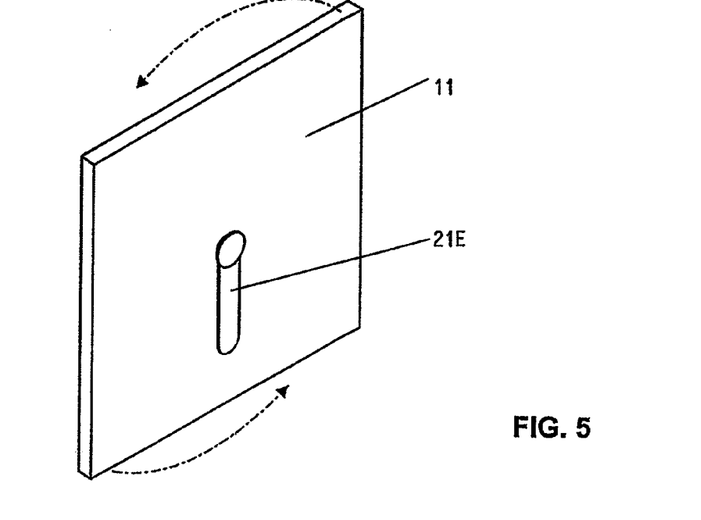
FIG. 5 is a perspective view of the position sensor of FIG. 1, embodying a gravitational switch.

An example of applications is for use as gravitational switches shown in FIG. 5 for toys which are played by changing its angular position, i.e. turning, to produce different sound and/or visual effects, such as a toy steering wheel. The board 11 supports the various electronic components on its rear side and is fixed within the casing of the wheel for turning therewith, while the conductor strip 21E remains suspended to point vertically downwardly, such that the relative position between the board 11 and the strip 21E changes. The casing houses a speaker and two light bulbs on its left and right sides, which are operated by suitable drivers controlled by the MCU 50 via the output register 52. By turning the wheel to the left or right, the relevant light bulb is turned on to give a corresponding car turning signal, or turning the wheel round through 180° will cause the speaker to give a beeping or car crash sound.

Figure 6:
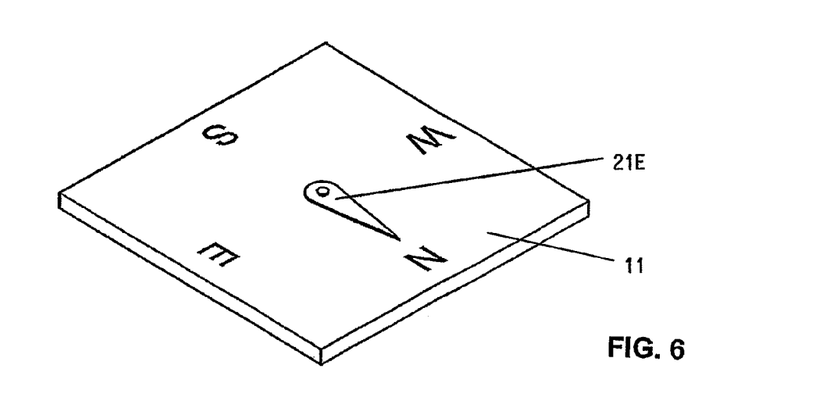
FIG. 6 is a perspective view of the position sensor of FIG. 1, embodying an electronic compass.

Given the nature of the subject position sensor or position sensing method, it can be used as or in the key component of an electronic compass shown in FIG. 6. In this example, the conductor strip 21E is magnetized to act as a compass needle which is supported horizontally for turning by the earth's magnetic field, and the conductive elements 14A to 14D are embedded underneath the "N", "E", "W", and "S" letters for contactless interaction with the needle to indicate direction on an LCD display.

Figure 7:
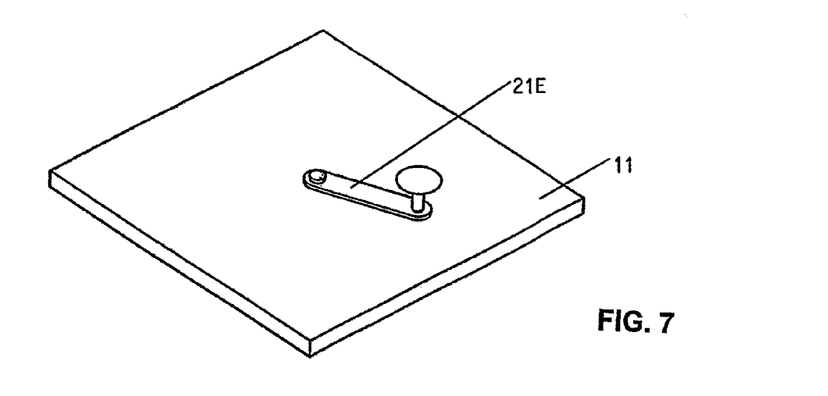
FIG. 7 is a perspective view of the position sensor of FIG. 1, embodying a directional switch.

A further intended application is a directional switch (joy stick) shown in FIG. 7, in which the conductor strip 21E is adapted for use as a handle for turning on the board 11. The position sensor outputs an electrical signal that indicates the direction to which the handle is turned, for performing an associated function.

In general, as the first and second parts 10 and 20 of the position device 100, i.e. the conductive elements 14A to 14D and conductor strip 21E, are movable relatively to each other, the strip 21E can instead be held and support the elements 14A to 14D (via the board 11) for relative angular movement.

It is envisaged that the number of the conductive elements (14A to 14D) on the first part 10 of the position device 100 is not necessarily four, depending upon the nature of the application and in particular the accuracy in position sensing. The minimum number is two, for detecting opposite up and down or left and right positions/directions, for example.

It is also envisaged that the conductor (21E) of the second part 20 of the position device 100 may be arranged to move along a straight track for example, such that the subject position sensor or position sensing method may provide or generate an output signal dependent upon relative linear positions of the conductor.

Figure 8:
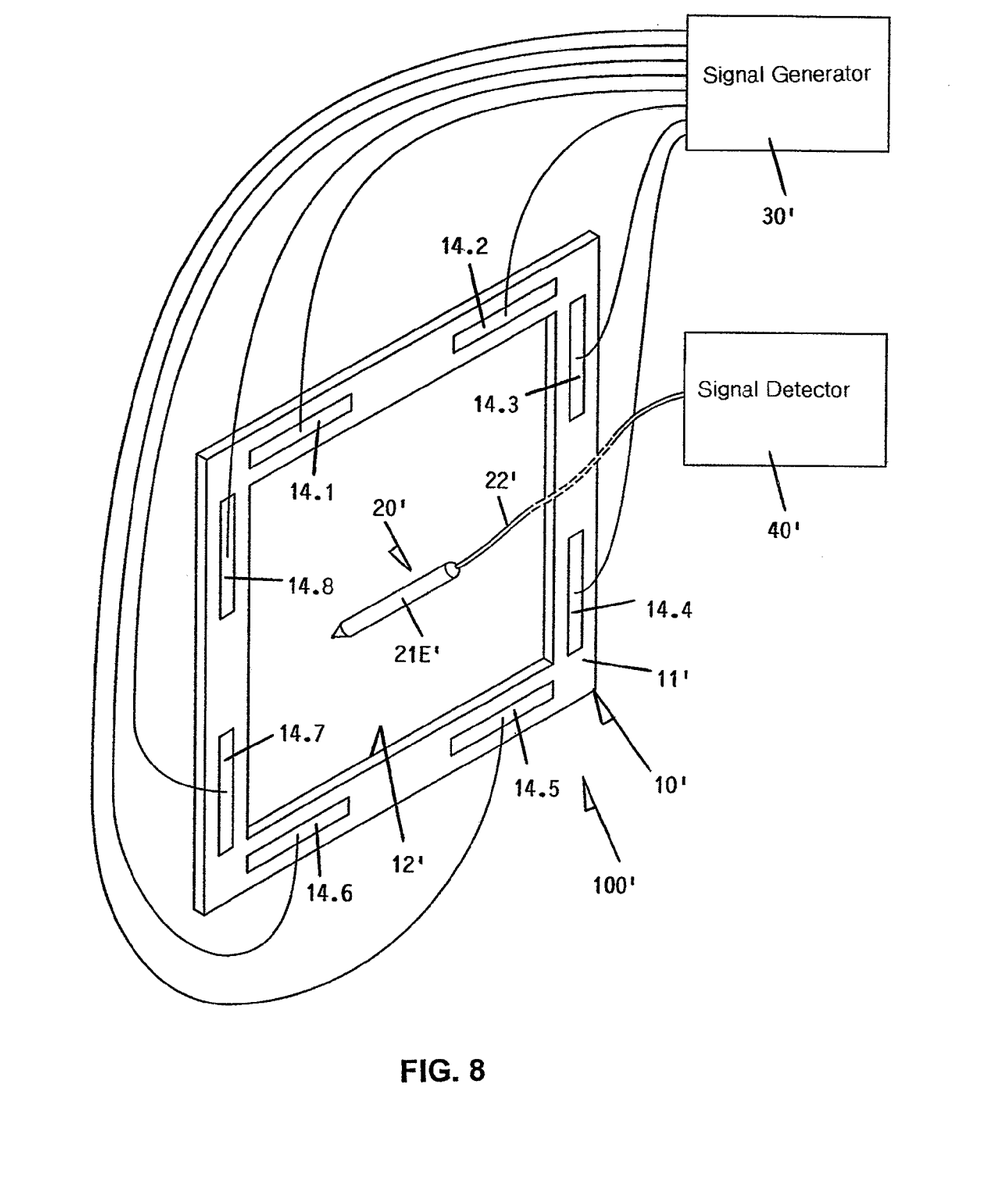
FIG. 8 is a schematic perspective view of a further embodiment of a position sensor in accordance with the invention, for use on a display screen.

Reference is now made to FIG. 8 showing a further position sensor embodying the invention, which operates in generally the same way as the embodiments described above, such as the embodiment of FIGS. 1 and 2 but this embodiment has a different construction, with equivalent components designated by the same reference numerals suffixed by an apostrophe. In this embodiment, the board 11' of the first part 10' of the position device 100' is designed for use on an LCD display screen or the like. It has a frame-like structure that includes a large rectangular central aperture 12' for matching and exposing the screen. There are a total number of eight (as opposed to four) conductive strips 14.1 to 14.8 on the board 11', which have individual connections to the signal generator 30'.

Another major difference lies in the conductor of the second part 20' being in the form of a conductive pen 21E' which is connected to the signal detector 40' by means of a flexible electrical cable/wire 22'. As the signal generator 30' and detector 40' constitute parts of the MCU-based operating circuit which shares the same casing with the board 11', the wire 22' also physically holds the pen 21E' adjacent to the board 11' for use therewith. Apart from enabling electrical connection, the wire 22' allows a much greater degree of freedom of movement of the second part conductor 21E' relative to the first part conductors 14.1 to 14.8.

During operation, the pen 21E' is used with its tip on the screen through the aperture 12' of the board 11', and the position of the pen tip on the screen, i.e. relative to the conductive strips 14.1 to 14.8 on the board 11', is instantly detected and determined according to any one of the methods as described above. Under the control of the program, e.g. a game program, which controls the scene being shown on the screen, an appropriate pen tip position on the screen may trigger a sound or score. Thus, a touch screen function is added, without having the screen itself made touch-sensitive.

Figure 9:
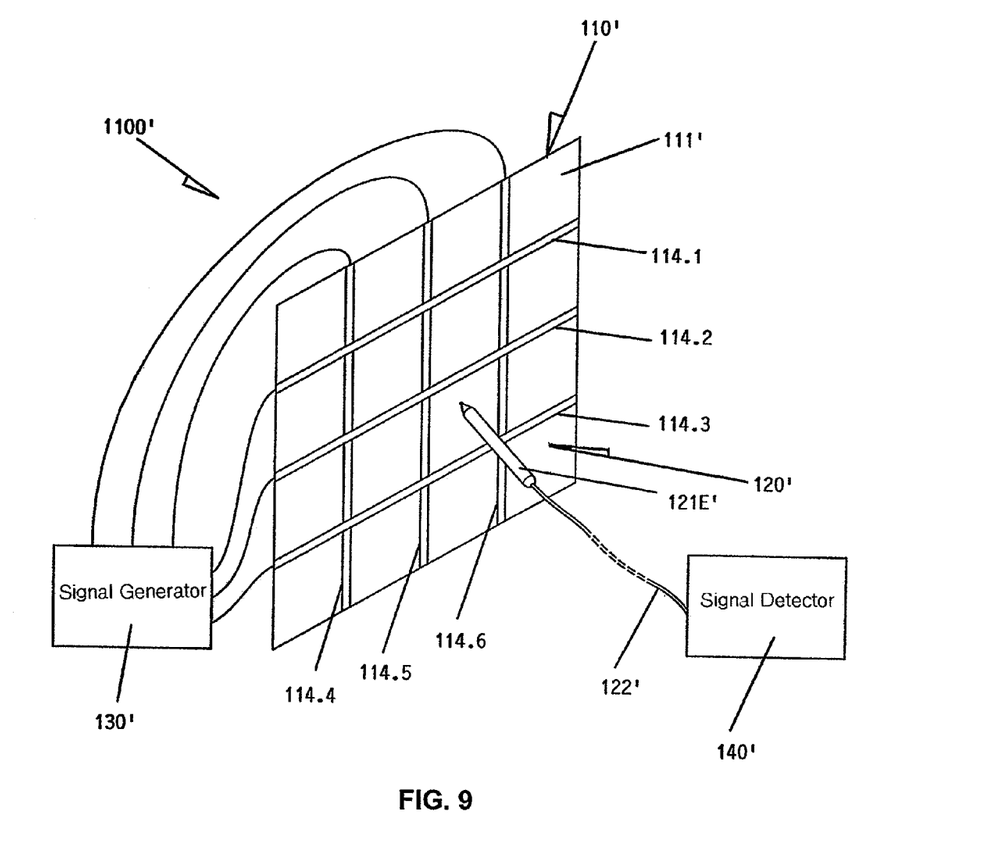
FIG. 9 is a schematic perspective view of yet another embodiment of a position sensor in accordance with the invention, for use as a touch pad.

Reference is finally made to FIG. 9 showing yet another position sensor embodying the invention, which has generally the same operation as the last embodiment of FIG. 8 but a different construction, with equivalent components designated by the same reference numerals prefixed by the number "1". In this embodiment, the board 111' of the first part 110' of the position device 1100' is not apertured and it acts as a touch pad for use in the playing of an electronic game or the like. The board 111' may be provided by a thin circuit board which has three parallel conductive lines 114.1, 114.2 and 114.3 on its front side running at right angles to those 114.4, 114.5 and 114.6 on its rear side. These lines 114.1 to 114.6 are individually connected to the signal generator 130'.

As contrary to the earlier embodiments, the second part 120' comprises a conductive pen 121E' which is connected to the signal detector 140' by a flexible electrical cable/wire 122'. The wire 122' physically holds the pen 121E' close to the board 111' for use thereon, with the signal generator 130' and detector 140' being parts of the MCU-based operating circuit sharing the same casing with the board 111'. Apart from enabling electrical connection, the wire 122' allows virtually free movement of the second part conductor 121E' relative to the first part conductors 114.1 to 114.6.

In operation, the pen 121E' is used with its tip on the board 111', and the position of the pen tip relative to the conductive lines 114.1 to 114.6 is instantly detected and determined according to any one of the methods as described above. Under the control of the program, e.g. a game program, the board 111' acts as a touch pad for accepting commands or data from the player using the pen 121E'.

In general, the first and second parts 10/10'/110' and 20/20'/120' of the position device 100/100'/1100' may be held together by any holding means other than the hinge 22 or wire 22'/122', so long as the holding means permits relative movement between the conductors of the two parts.

It is envisaged that the electrical signals used for position sensing may be made different from each other in any other aspects, i.e. other than in terms of time or frequency as described above. For example, the signals may include pulses of different widths or different pulse patterns for differentiation.

The invention has been given by way of example only, and various other modifications of and/or alterations to the described embodiments may be made by persons skilled in the art without departing from the scope of the invention as specified in the appended claims.

The invention claimed is:

1. A position sensor comprising:
    a first part comprising a plurality of electrically conductive elements;
    a second part comprising an electrical conductor;
    holding means holding the first part and the second part together with the conductive elements and the conductor being spaced apart and permitting relative movement between the conductive elements and the conductor;
    a signal generator adapted to generate and supply a plurality of different electrical signals to one of the first part and the second part for reception in a contactless manner by the other of the first part and the second part with a magnitude that is dependent upon the relative position between the conductive elements and the conductor; and
    a signal detector connected to the other of the first part and the second part for differentiating the electrical signals received thereby to determine the relative position between the conductive elements and the conductor.

2. The position sensor as claimed in claim 1, wherein the electrical signals comprise orthogonal signals for or associated with the conductive elements respectively.

3. The position sensor as claimed in claim 1, wherein the electrical signals are different in terms of time.

4. The position sensor as claimed in claim 3, wherein the electrical signals are shifted in time from each other.

5. The position sensor as claimed in claim 1, wherein the electrical signals are different in terms of frequency.

6. The position sensor as claimed in claim 5, wherein the electrical signals are at different frequencies.

7. The position sensor as claimed in claim 1, wherein the holding means comprises a hinged connection that permits relative pivotal movement between the conductive elements and the conductor.

8. The position sensor as claimed in claim 7, wherein one of the first part and the second part has a centre of gravity offset from the hinged connection such that the said part will stay lowermost under the action of gravity while the other of the first part and the second part is angularly moved about the hinged connection.

9. The position sensor as claimed in claim 8, wherein the conductor has a centre of gravity offset from the hinged connection.

10. The position sensor as claimed in claim 7, wherein the conductive elements are located at regular positions around the hinged connection, and the conductor is elongate and has one end connected by the hinged connection.

11. The position sensor as claimed in claim 1, wherein the holding means comprises electrical wired connection.

12. A position sensor comprising:

a first part comprising a plurality of electrically conductive elements;

a second part comprising an electrical conductor;

holding means holding the first part and the second part together with the conductive elements and the conductor being spaced apart and permitting relative movement between the conductive elements and the conductor;

a signal generator adapted to generate and supply an electrical signal to the conductor for reception in a contactless manner by the conductive elements with a magnitude that is dependent upon the relative position between the conductor and the conductive elements; and a signal detector connected to conductive elements for analyzing the magnitude of the electrical signals received thereby to determine the relative position between the conductor and the conductive elements.

13. The position sensor as claimed in claim 12, wherein the holding means comprises a hinged connection that permits relative pivotal movement between the conductive elements and the conductor.

14. The position sensor as claimed in claim 13, wherein one of the first part and the second part has a centre of gravity offset from the hinged connection such that the said part will stay lowermost under the action of gravity while the other of the first part and the second part is angularly moved about the hinged connection.

15. The position sensor as claimed in claim 14, wherein the conductor has a centre of gravity offset from the hinged connection.

16. The position sensor as claimed in claim 13, wherein the conductive elements are located at regular positions around the hinged connection, and the conductor is elongate and has one end connected by the hinged connection.

17. The position sensor as claimed in claim 12, wherein the holding means comprises electrical wired connection.

18. A method of sensing position comprising the steps of:
(a) providing a first part comprising a plurality of electrically conductive elements;
(b) providing a second part comprising an electrical conductor;
(c) providing holding means holding the first part and the second part together with the conductive elements and the conductor being spaced apart and permitting relative movement between the conductive elements and the conductor;
(d) generating and supplying at least one electrical signal to one of the first part and the second part for reception in a contactless manner by the other of the first part and the second part with a magnitude that is dependent upon the relative position between the conductive elements and the conductor; and
(e) detecting and analyzing the magnitude of the electrical signals received by the other of the first part and the second part to determine the relative position between the conductive elements and the conductor.

19. The method of sensing position as claimed in claim 18, wherein:
step (d) comprises generating and supplying a plurality of different electrical signals to the conductive elements respectively for reception in a contactless manner by the conductor with a magnitude that is dependent upon the relative position between the conductive elements and the conductor; and
step (e) comprises detecting and analyzing the magnitude of the electrical signals received by the conductor to determine the relative position between the conductive elements and the conductor.

20. The method of sensing position as claimed in claim 18, wherein:
step (d) comprises generating and supplying a plurality of an electrical signal to the conductor for reception in a contactless manner by the conductive elements with a magnitude that is dependent upon the relative position between the conductive elements and the conductor; and
step (e) comprises detecting and analyzing the magnitude of the electrical signals received by the conductive elements to determine the relative position between the conductive elements and the conductor.

* * * * *